United States Patent
Domen et al.

(10) Patent No.: US 6,838,413 B2
(45) Date of Patent: Jan. 4, 2005

(54) OXYSULFIDE PHOTOCATALYST FOR DECOMPOSITION OF WATER BY VISIBLE LIGHT

(75) Inventors: Kazunari Domen, Kanagawa (JP); Michikazu Hara, Kanagawa (JP); Tsuyoshi Takata, Kanagawa (JP); Akio Ishikawa, Tokyo (JP)

(73) Assignee: Japan Science and Technology Agency, Saitama (JP)

( * ) Notice: Subject to any disclaimer, the term of this patent is extended or adjusted under 35 U.S.C. 154(b) by 0 days.

(21) Appl. No.: 10/433,460

(22) PCT Filed: Jan. 23, 2002

(86) PCT No.: PCT/JP02/00469

§ 371 (c)(1),
(2), (4) Date: Jun. 3, 2003

(87) PCT Pub. No.: WO02/062467

PCT Pub. Date: Aug. 15, 2002

(65) Prior Publication Data

US 2004/0029726 A1 Feb. 12, 2004

(30) Foreign Application Priority Data

Feb. 7, 2001 (JP) ........................................ 2001-030628

(51) Int. Cl.[7] .................. B01J 27/02; B01J 27/043; B01J 23/00; C09K 11/08; C01D 5/10
(52) U.S. Cl. .................. 502/216; 502/222; 502/223; 502/302; 252/301.6 S; 252/301.4 S; 423/518
(58) Field of Search .................. 502/216, 222, 502/223, 302; 252/301.6 S, 301.4 S; 423/518

(56) References Cited

U.S. PATENT DOCUMENTS 3,948,798 A * 4/1976 Ferri et al. ............ 252/301.4 S

OTHER PUBLICATIONS

Ishikawa et al., "Novel Synthesis and Photocatalytic Activity of Oxysulfide Sm2Ti2S2O5", Chem. Mater. 2003, 15, 4442–4446.*
Ishikawa et al., "Oxysulfide Sm2Ti2S2O5 as a Stable Photocatalyst for Water Oxidation and Reduction under Visible Light Irradiation (lambda less than or equal to 650 nm)", JACS Articles (J. Am. Chem. Soc. 2002, 124, 13547–13553.*

* cited by examiner

Primary Examiner—Mark L. Bell
Assistant Examiner—Patricia L. Hailey
(74) Attorney, Agent, or Firm—Sherman & Shalloway

(57) ABSTRACT

A photocatalyst which comprises an oxysulfide containing at least one transition metal; a preferable photocatalyst which also comprises a rare earth element such as Sm in addition to the above and wherein the transition metal is at least one selected from the group consisting of Ti and Nb; a more preferable photocatalyst which further comprises a promoter comprising a transition metal such as Pt loaded on each of the above photocatalyst; and a catalyst for use in the decomposition of water by a light which comprises one of the above oxysulfide photocatalysts.

12 Claims, 3 Drawing Sheets

OXYSULFIDE PHOTOCATALYST FOR DECOMPOSITION OF WATER BY VISIBLE LIGHT

FIELD OF THE INVENTION

The present invention relates to a novel photocatalyst. Namely, this invention relates to a visible light active photocatalyst comprising oxysulfide which contains at least one transition metal, and also relates to a photocatalyst for the water-splitting.

BACKGROUND OF THE INVENTION

The following photocatalytic reaction is well-known as a technique to obtain an aimed subject. That is, the light is irradiated to a solid compound which has a photocatalytic function so as to generate exited electrons and holes. Then a substance is oxidized or reduced by said exited electrons and holes and obtain the aimed subject.

In particular, photocatalytic decomposition of water, is interested in from the view point of solar energy conversion. Further, a photocatalyst which shows activity to the photocatalytic decomposition of water can be recognized as an excellent photo functional material which provides function such as photo absorption, electrolytic separation or oxidation-reduction reaction at the surface.

Kudo, Kato et al, are explaining that alkaline tantalate or alkaline earth element is a photocatalyst which shows excellent activity to the stoichiometric photocatalytic decomposition of water by quoting various prior arts [for example, Catal. Lett., 58 (1999), 153–155; Chem. Lett., (1999), 1207; Surface, Vol. 36, No. 12 (1998), 625–645 (hereinafter shortened to Document A)]. In the above Document A, there is an explanation about an useful photocatalytic materials for proceeding the decomposing reaction of water to hydrogen and/or oxygen using a photocatalyst, and many indications about photocatalyst used for stoichiometric photocatalytic decomposition of water are mentioned. Further, a photocatalyst which loads a promoter such as platinum or NiO is referred.

However, only metal oxides are used as photocatalysts in Document A. And in the cases of various solid photocatalyst, since the width of a forbidden band exists between a valence electron band and a conduction band, that is, band gap energy is large (>3 eV), it is difficult to excite it by low energy (energy: under 3 eV). On the contrary, almost all of the conventional solid photocatalyst which can generate electrons or holes by visible-light radiation are unstable under the condition of photo-catalytic water decomposing reaction. For example, the band gap energy of CdS or Cu—ZnS is 2.4 eV, but the catalytic reaction is restricted because it is affected by photo-corrosive action, which is corrosive oxidative action. In the meanwhile, almost all of the solar light which reaches to the surface of the earth is the visible light radiation of lower energy. Therefore, for the purpose to progress various photo-catalytic reactions effectively, a stable photocatalyst which acts by visible light is needed. However, among the conventional technique, there is no technique to satisfy the above requirement.

As shown in FIG. 5, the U.V.(ultra violet)·visible light diffuse reflectance spectrum of cadmium sulfide CdS on the market (99.99% purity) is measured and it become clear that it absorbs the light of spectrum region from ultra violet to visible light of 550 nm. Further, according to the reports of many researchers, in the case of CdS, since a valence electron band and a conduction band, which form band gap 2.4 eV, has surplus to generate oxygen and hydrogen by electric potential view, theoretically it is deemed to have an ability to decompose water to hydrogen and oxygen. However, there is a report which reports that when decomposing reaction of water is carried out by irradiating visible light over than 440 nm, hydrogen can be obtained stable, but the generation of oxygen can not be observed at all. This phenomenon can be explained as follows. That is, photo dissolution of catalyst itself (photo-corrosive action) is caused because of bad stability of chemical species on catalyst surface and when a positive hole in the inside of solid caused by photo excitation is transferred to the surface, it oxidizes a $S^{2-}$ on the surface prior to a water molecule and forms a surface film.

From the above fact, it is obviously known that the pure sulfide CdS can reduce protons to hydrogen by visible light having longer wavelength than 440 nm, but is not a so stable material against nascent oxygen so as to generate oxygen from water and does not have such ability.

The inventors of the present invention have conjectured that, since a valence electron of a nitrogen atom has higher energy than that of oxygen atom, a band gap energy of metal compound containing nitrogen atom can be made smaller than that of metal oxide, and considered that a metal and a metal compound bonded with adequate amount of nitrogen atoms become possible to generate excited electrons and holes and will become a photocatalyst which acts by visible light irradiation. And the inventor of the present invention synthesized oxynitride containing a transition metal and proposed a photocatalyst which acts by visible light (refer to JP Application No. 2000-256681).

Still more, since a valence band of numerous sulfides is originated to S 3P orbit and is locating at negative electric potential compared with O2p orbit of oxide, a sulfide is known as an advantageous material to accomplish the visible light absorption.

The object of the present invention is to provide a novel photocatalyst which can generate hydrogen and oxygen from water in stable by visible light irradiation. In the meanwhile, as mentioned above, valence bands of numerous sulfides are locating at more negative potentials compared to those of oxides, and it is possible to conjecture that the numerous sulfides improve the characteristics of visible light absorption. Therefore the inventors of the present invention, considered that a metal and a metal compound which are bonded with adequate amount of sulfur atoms becomes possible to generate excited electrons and holes by absorption of visible light of longer wave length, and it will be possible to produce a photocatalyst which acts by visible light. Accordingly, the inventors of the present invention synthesized a compound in which an oxide of transition metal and a transition metal bonded with adequate amount of sulfur atoms are existing and the photo-catalytic characteristics of the compound is investigated, and have found that the compound acts as a photocatalyst which can generate both hydrogen and oxygen by photo decomposition of water under the presence of a sacrificial catalyst. Thus, the inventors of the present invention have accomplished the present invention.

DISCLOSURE OF THE INVENTION

The first one of the present invention relates to a photocatalyst comprising an oxysulfide containing at least one transition metal. Desirably, the first one of the present invention is said photocatalyst comprising an oxysulfide further containing a rare earth element such as Sm, wherein a transition metal is at least one selected from the group consisting of Ti and Nb. More desirably, the first one of the present invention is said photocatalyst comprising an oxysulfide wherein the photocatalyst is loading a promoter comprising a transition metal. Furthermore desirably, the first one of the present invention is said photocatalyst comprising an oxysulfide wherein a promoter is platinum.

The second one of the present invention relates to a photocatalyst for photo decomposition of water comprising an oxysulfide containing at least one transition metal. Desirably, the second one of the present invention is said photocatalyst for photo decomposition of water comprising an oxysulfide further containing a rare earth element such as Sm, wherein a transition metal is at least one selected from the group consisting of Ti and Nb. More desirably, the second one of the present invention is said photocatalyst for photo decomposition of water comprising an oxysulfide wherein the photocatalyst for photo decomposition of water is loading a promoter comprising a transition metal. Furthermore desirably, the second one of the present invention is said photocatalyst for photo decomposition of water comprising an oxysulfide wherein a promoter is platinum.

BRIEF ILLUSTRATION OF THE DRAWINGS

Figure 3:
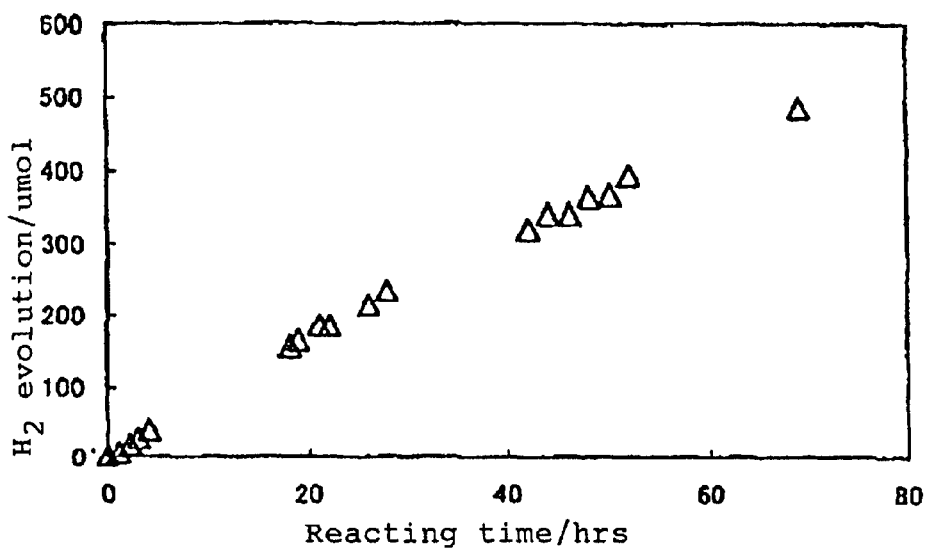

FIG. 3 shows hydrogen evolution rate by suspending 0.2 g of "1 wt % Pt promoter being loaded on $Sm_2Ti_2O_5S_2$", which is a photocatalyst of Example 1, into 0.200 $dm^{-3}$ of aqueous solution of 10 vol % methanol and irradiating the visible light longer than 440 nm wavelength.

Figure 4:
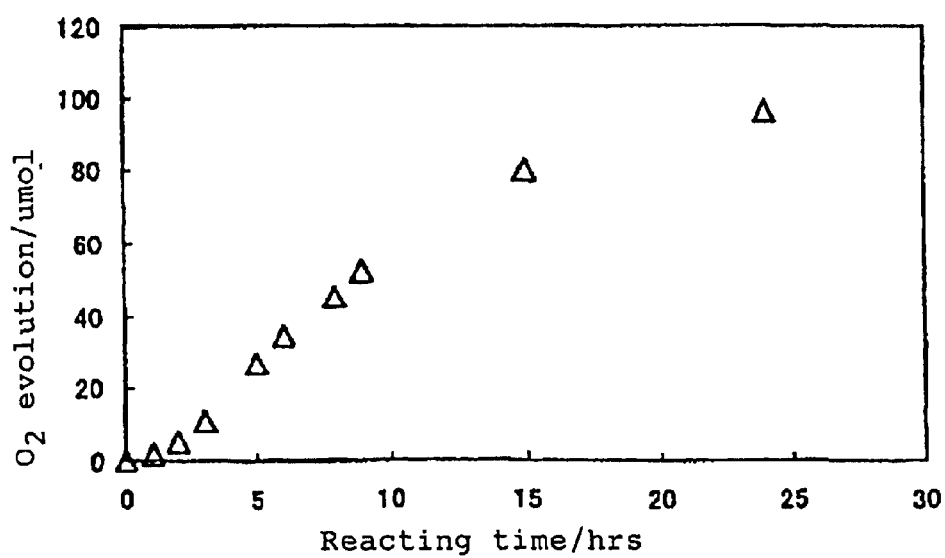

FIG. 4 shows oxygen evolution rate by suspending 0.2 g of "1 wt % Pt promoter being loaded on $Sm_2Ti_2O_5S_2$", which is a photocatalyst of Example 1, into aqueous solution of 0.01 mol $dm^{-3}$ $AgNO_3$ and irradiating the visible light longer than 440 nm wavelength.

Figure 5:
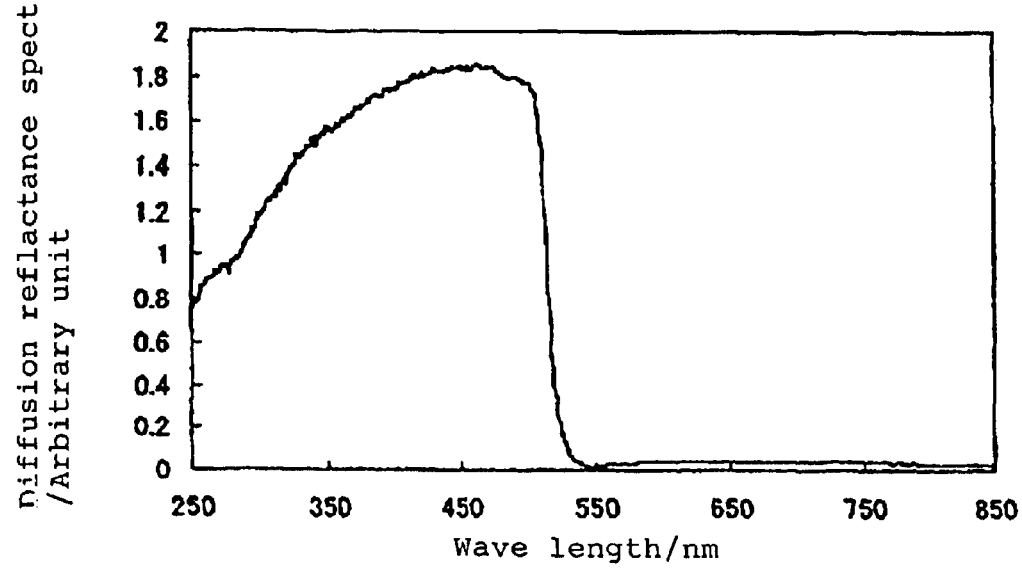

FIG. 5 shows the U.V.-visible light diffuse reflectance spectrum of cadmium sulfide CdS (99.99% purity) on the market.

Figure 6:
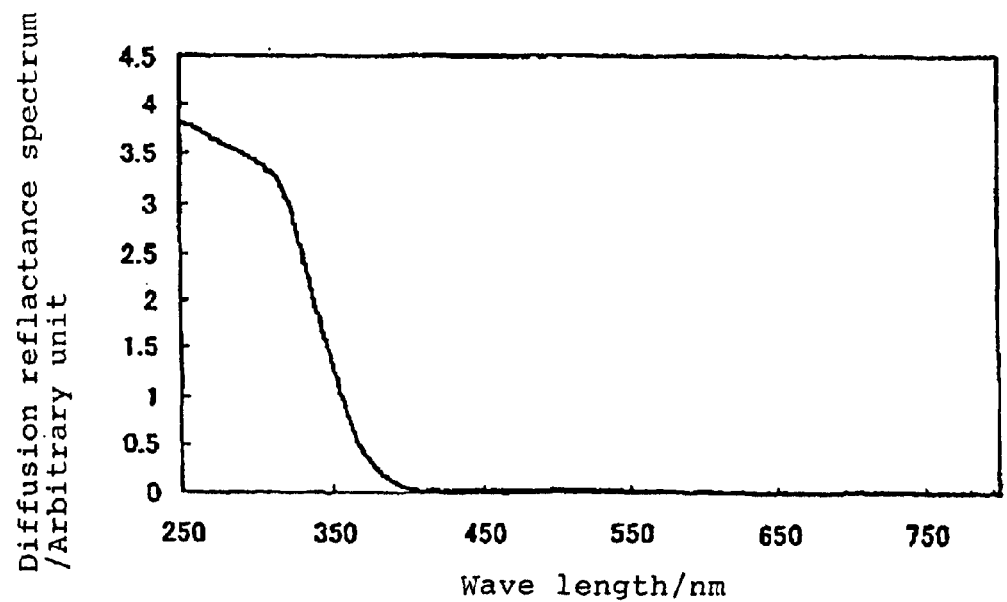

FIG. 6 shows the U.V.-visible light diffuse reflectance spectrum of titanium oxide $TiO_2$ (99.99% purity) on the market.

The present invention will be illustrated more in details.

A. The photocatalyst of the present invention can be obtained by following process. That is, oxide or sulfide of rare earth and oxide or sulfide of transition metal are mixed together with by desired mixing amount and contained into a sealed tube which does not cause a problem of contamination, for example, a quartz tube or a niobium tube. After vacuum sealed, calcined by adjusting the temperature elevating speed including maintaining the temperature at constant temperature and heating time.

As a desirable example of rare earth oxide, samarium oxide ($Sm_2O_3$) or lanthanum oxide ($La_2O_3$) can be mentioned and as a desirable example of rare earth sulfide, samarium sulfide ($Sm_2S_3$) or lanthanum sulfide ($La_2S_3$) can be mentioned. And as a desirable example of transition metal oxide, titanium oxide ($TiO_2$) or niobium oxide ($Nb_2O_5$) can be mentioned and as a desirable example of transition metal sulfide, titanium sulfide ($TiS_2$) or niobium sulfide ($Nb_2S_5$) can be mentioned.

B. The catalytic activity of the oxysulfide compound containing transition metal obtained by the above calcination process can be improved by providing a promoter.

As the promoter, platinum (Pt) or Nickel oxide (NiO) can be mentioned. The amount of the promoter to be provided to the catalyst is from 0.1 to 10 wt %.

As the method to provide the promoter, a conventional providing method of a promoter to a photocatalyst can be used. For example, in the case of Pt, aqueous solution of tetraamminedichloroplatinum $[Pt(NH_3)_4Cl_2]$ is penetrated into catalyst and dried, then reduced by hydrogen, thus Pt can be added.

EXAMPLES

The present invention will be illustrated more in details according to the Example. However, the following Examples are mentioned for the purpose to clearly explain the usefulness of the present invention and not to intending to limit the scope of the present invention.

Example 1

To produce 5 g of $Sm_2Ti_2O_5S_2$, samarium sulfide ($Sm_2S_3$), titanium oxide ($TiO_2$) and titanium sulfide ($TiS_2$) are mixed together with by 1:1:1 ratio and contained into a quartz tube. After vacuum sealing the quartz tube, the calcinating process is carried out by following condition. The temperature is elevated from the room temperature to 400° C. by 15° C./1 hr elevating speed and maintain the temperature of 400° C. for 24 hours. After that, the temperature is elevated to 1000° C. by 20° C./1 hr elevating speed and maintain said temperature for 7 days. Then the temperature is cooled down to the room temperature by 30° C./1 hr cooling speed, and the aimed product is obtained.

Loading of Pt Promoter

The corresponding amount of tetraamminedichloroplatinum $Pt(NH_3)_4Cl_2$ to 1 wt % of the catalyst is impregnated onto the catalyst in aqueous solution and dried on a water bath, then reduced by hydrogen at 573 K for 2 hours.

Figure 1:
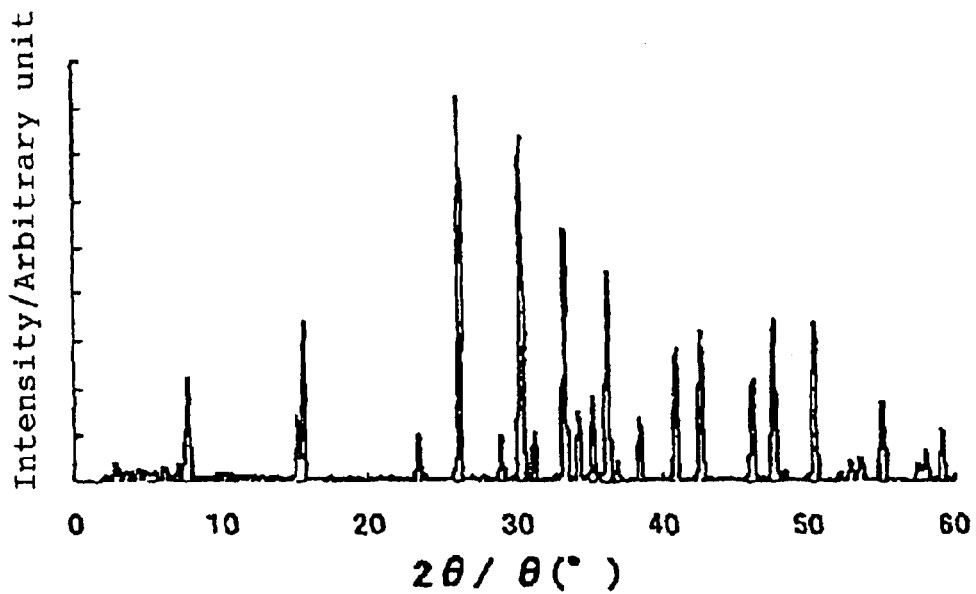
FIG. 1 shows X-ray diffraction pattern of calcined $Sm_2Ti_2O_5S_2$ according to the producing condition of $Sm_2Ti_2O_5S_2$ of Example 1.

The X-ray diffraction pattern after calcination is shown in FIG. 1. All diffraction peaks in the graph are assigned to those of $Sm_2Ti_2O_5S_2$, and the generation of $Sm_2Ti_2O_5S_2$ is confirmed.

Figure 2:
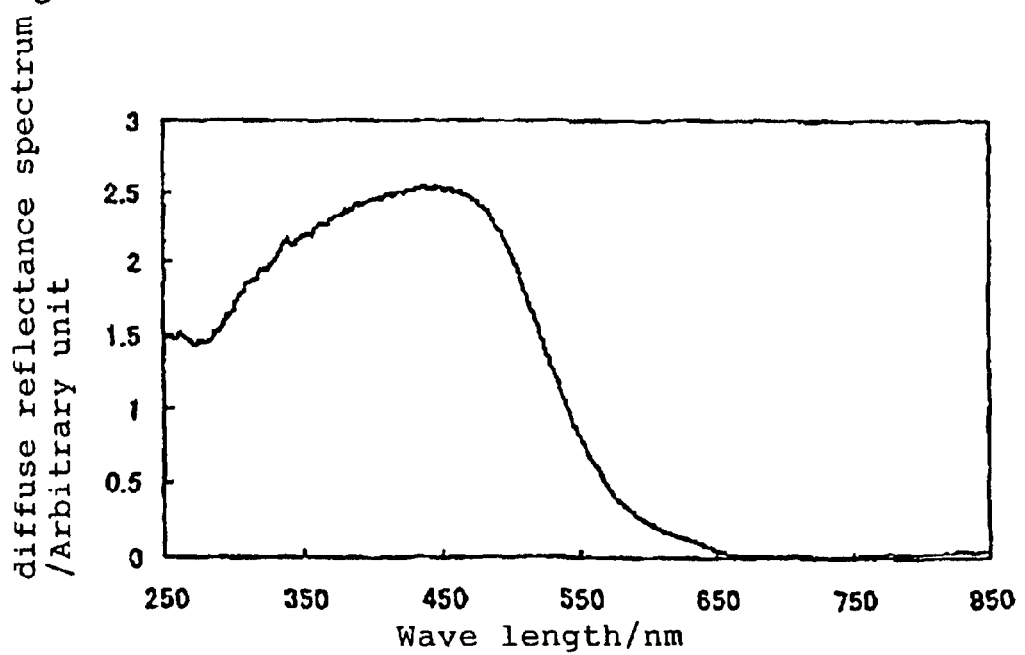
FIG. 2 shows U.V.-visible light diffuse reflectance spectrum of calcined $Sm_2Ti_2O_5S_2$ according to the producing condition of $Sm_2Ti_2O_5S_2$ of Example 1.

U.V.-visible light diffuse reflectance spectrum of the above material is shown in FIG. 2. According to FIG. 2, it becomes clear that said material absorbs the light of wavelength shorter than 650 nm.

FIG. 3 shows hydrogen evolution rate by suspending 0.2 g of 1 wt % Pt promoter loaded material into 0.200 $dm^{-3}$ of aqueous solution of 10 vol % methanol and irradiating the visible light of wavelength longer than 440 nm. As the light source, a xenon lamp of 500W is used, and visible light of longer wavelength than 440 nm is irradiated by using a wavelength filter which cut off the light of shorter wavelength than 440 nm. As shown in FIG. 3, it become clear that the above catalyst can generate hydrogen constantly from aqueous solution of methanol under the irradiation of visible light of longer wavelength than 440 nm. 0.2 g of said material is suspended in aqueous solution of 0.01 mol $dm^{-3}$ $AgNO_3$, the visible light of longer wavelength than 440 nm is irradiated, and oxygen evolution rate is shown in FIG. 4. The reaction is carried out by the same condition. It becomes clear that said material can generate oxygen from aqueous solution of silver nitrate under the irradiation of visible light longer than 440 nm wavelength. As mentioned above, it is recognized that $Sm_2Ti_2O_5S_2$ has an ability to reduce protons to hydrogen and to oxidize water to oxygen by the visible light of longer wavelength than 440 nm.

Comparative Example 1

In this Comparative Example, cadmium sulfide (99.99% purity) on the market is used. Same to the Example 1, the reaction is carried out under the irradiation of the visible light longer than 440 nm wavelength, and the results of experiments of hydrogen generation and oxygen generation are illustrated.

The results show that although hydrogen is generated stably, the generation of oxygen is not observed. That is, pure cadmium sulfide CdS can reduce a proton to hydrogen by visible light of longer than 440 nm wave length, however, is not a so stable material to generate oxygen from water.

Comparative Example 2

In this Comparative Example, the photo catalytic characteristics of titanium dioxide $TiO_2$ on the market is explained for the comparison with the present invention. FIG. 6 shows that the diffuse reflectance spectrum of said titanium dioxide $TiO_2$ is shorter than 420 nm. Therefore, in the reaction using light (U.V. light) which can be absorbed, it is understood that $TiO_2$ has an ability to decompose water to hydrogen and oxygen.

However, it is a matter of cause, under the irradiation of visible light longer than 440 nm, the generation of hydrogen and oxygen is not observed.

In the above Example 1, the case in which Ti is used as a transition metal is explained, however, the similar result can be obtained when Nb, which is a transition metal usually used in the field of photocatalyst, is used.

Industrial Applicability

As mentioned above, the photocatalyst obtained by the present invention, is the catalyst that acts by visible light shorter than 650 nm wavelength, which is the majority in solar light reaching to the surface of the earth. By carrying out the photocatalyst reaction with solar light, the useful compound can be produced. Further, as indicated in Examples, since said photocatalyst has an ability to decompose water to hydrogen and oxygen by visible light radiation, it is hopeful to be used as a photocatalyst which converts solar light to hydrogen being considered as the energy of next generation.

What is claimed is:

1. A photocatalyst, comprising oxysulfide containing at least one transition metal, wherein the photocatalyst further contains a rare earth element wherein said rare earth element is samarium.

2. The photocatalyst comprising oxysulfide of claim 1, wherein the photocatalyst loads a promoter of transition metal.

3. The photocatalyst comprising oxysulfide of claim 2, wherein the promoter is platinum.

4. The photocatalyst comprising oxysulfide of claim 1, wherein the transition metal is at least one selected from the group consisting of titanium and niobium and wherein said photocatalyst further contains a rare earth element wherein the rare earth element is samarium.

5. The photocatalyst comprising oxysulfide of claim 4, wherein said photocatalyst loads a promoter of transition metal.

6. The photocatalyst comprising oxysulfide of claim 5, wherein the promoter is platinum.

7. An aqueous suspension yielding a photo decomposition reaction of water comprising, a photocatalyst comprising oxysulfide containing at least one transition metal, wherein the photocatalyst further contains samarium.

8. The aqueous suspension of claim 7, wherein the photocatalyst loads a promoter of transition metal.

9. The aqueous suspension of claim 8, wherein the promoter is platinum.

10. The aqueous suspension of claim 7, wherein the transition metal is at least one selected from the group consisting of titanium and niobium and wherein said photocatalyst further contains a rare earth element wherein the rare earth element is samarium.

11. The aqueous suspension of claim 10, wherein said photocatalyst loads a promoter of transition metal.

12. The aqueous suspension of claim 11, wherein the promoter is platinum.

* * * * *